United States Patent Office 3,036,881
Patented May 29, 1962

3,036,881
CATALYZED OXIDATION OF URANIUM IN CARBONATE SOLUTIONS
Warren E. Clifford, San Francisco, Calif., assignor, by mesne assignments, to the United States of America as represented by the United States Atomic Energy Commission
No Drawing. Filed May 23, 1957, Ser. No. 661,264
9 Claims. (Cl. 23—14.5)

The invention relates, in general, to the processing of uranium in a carbonate solution and, more particularly, to improved methods of catalyzing the oxidation of uranium in a carbonate solution.

Aqueous solutions of alkaline carbonates are used extensively for leaching uranium from various solids such as ores and residues in a variety of recovery and purification processes. The carbonate solutions are alkaline and contain variable ratios of carbonate and bicarbonate ions dependent on operating pH conditions. In such a solution hexavalent uranium is complexed by the carbonate ion to form uranyl tricarbonate ion, $UO_2(CO_3)_3^{-4}$, as the soluble species; however, at least a part of the uranium in such ores and residues often occurs in a lower valent oxidation state which does not readily produce a species which is soluble in such leach solutions. Also, the uranium may be partially reduced by contact with steel processing equipment or other effective reducing agent during mining or preliminary processing.

For example, if a uranium mineral such as pitchblende, uraninite or coffinite is present in the ore the carbonate leach solution does not effectively dissolve all of the available uranium since the lower valent states, especially the tetravalent, does not dissolve in the solution or react to produce insoluble hydrous oxides or hydroxides on contact with the ore. Under other process conditions in which the leach solution contains an excess of $CO_3^=$ and the $OH^-$ is buffered out with $HCO_3^-$, a soluble tetravalent uranium carbonate may be produced; however, this complex is very unstable if the $OH^-$ concentration increases during processing and uranium can be lost from the solution by precipitation as $U(OH)_4$ at an inappropriate time in the procedure. In conventional practice, uranium ores may be oxidized by roasting in air. This procedure is not always effective, entails additional operations and equipment, and cannot be applied to solutions. Chemical oxidation may be slow and reagent cost high.

The present invention is predicated on the discovery that certain metallic ions catalyze the oxidation of lower valent states of uranium in such a solution with the oxygen in air, $O_2$, and also by hypochlorite. Such catalysis is made more effective by the provision of superior operating conditions and combinations of reagents in oxidizing uranium contained in carbonate solutions in general, and is equally effective in oxidizing uranium present in solid materials during leaching operations thereby preventing the formation of insoluble lower valent hydroxides in such solutions and speeding up as well as increasing the amount of uranium leached thereby. Subsequently, the carbonate solution may be processed for the recovery of uranium by various procedures including processes as conventionally practiced, e.g., in the domestic mining industry.

Accordingly, it is an object of the invention to provide a catalytic process for promoting the oxidation of lower valent uranium compounds in an alkaline carbonate solution.

Another object of the invention is to provide a catalyzed air oxidation method for use in the carbonate leaching of uranium containing solids to improve the recovery of uranium therefrom.

Still another object of the invention is to provide a catalytic method for promoting the oxidation of uranium in a carbonate solution with air, oxygen gas, and hypochlorite oxidizing agents.

One other object of the invention is to provide a carbonate leaching process employing hypochlorite oxidizing agent for the more economical leaching of lower valent uranium compounds and minerals from solids.

A further object of the invention is to provide catalyzing agents for promoting the oxidation of lower valent uranium ionic species and/or uranium compounds in a carbonate solution.

A still further object of the invention is to provide a catalyzed oxidation carbonate leaching process for improving the recovery of uranium from ores containing uranium in lower valent oxidation states.

Other objects and advantages of the invention will become apparent by consideration of the following description.

The starting material in the present process may comprise uranium oxides such as $U_3O_8$, $UO_2$, lower valent hydroxides such as $U(OH)_4$ or primary-secondary uranium minerals such as carnitite-uraninite ores, all of which may contain uranium in oxidation states lower than the hexavalent and particularly the uranous and mixed uranous-uranyl states. Residues obtained in other processes and having generally similar characteristics may likewise be processed. Solutions or other materials containing lower valent uranium compounds can likewise be converted to the carbonate form and the oxidative process of the invention applied thereto. The ore materials or other solid, if necessary, are first subjected to grinding and screening to provide the proper particle size to render the uranium content accessible to the leaching solution. Customarily, particle sizes in the vicinity of minus 100 mesh are adequate; however, with certain ores, e.g., limestones, grinding to nominally minus 325 mesh may be required. Solutions are converted to the carbonate form by adding $Na_2CO_3$ or $NaHCO_3$ thereto.

In accordance with the invention, the finely divided source material is disposed in equipment adapted for heating, agitation, and the introduction of reagent solutions and gases if air or $O_2$ is to be employed as the oxidant. The solid is then contacted at elevated temperatures with an aqueous alkaline carbonate solution under catalyzed oxidizing conditions to selectively leach uranium therefrom. In the event that vanadium is present some vanadium is also leached; however, most other materials which are present in ores and residues are not leached to any great extent.

More particularly, carbonate solutions containing from about 4 to 10% of sodium carbonate and/or from about 0.25 to 7% of sodium bicarbonate are generally used. Certain very favorable ratios and regent concentration limits of the reagents and concurrent pH conditions will be set forth hereinafter.

For the purposes of the invention catalytic quantities of compounds of certain metallic elements are added to the solution to provide ionic oxidation states of the metals which effectively promote the oxidation of the uranium in the solution. In theory the ions of any oxidation-reduction couple above $OH^-$-air and $UO_2$—$UO_2(CO_3)_3^{-4}$ could act as a catalyst; however, it is found experimentally that some substances meeting that qualification and which will oxidize reduced uranium compounds when introduced in the oxidized state are not effective when introduced in the reduced state. These materials include $PbO$—$PbO_2$, $Fe(CN)_6^{-4}$—$Fe(CN)_6^{-3}$ and $Hg$—$HgCl_2$. These materials therefore cannot behave in a catalytic fashion.

Ionic species corresponding to the oxidation states of the following couples produced by the addition of appropriate compounds to carbonate solutions are catalytically active in oxidation with $O_2$ or air: $C^{++}$—$Co^{+++}$; $V^{+4}$—$V^{+5}$; $Tl^{+}$—$Tl^{+3}$; and $Mn^{+2}$—$Mn^{+4}$ or possibly $Mn^{+3}$—$Mn^{+4}$ on consideration of the oxidation potentials. The ions of the couple $Cu^{+}$—$Cu^{++}$ are very effective for the indicated purpose. Moreover, the catalytic effect of the Cu species is greatly enhanced on addition of ammonia to the system and the Cu catalysis is also effective when using hypochlorite (or $Cl_2$) as the oxidant. Consideration of the various couples indicates that suitable couples require, as a minimum, that the oxidation potential be above the $OH^-$-air couple and about equal to or greater than the $H_2O_2$—$HO_2^-$ couple consistent with the view that oxygen reduction which is concurrent with uranium oxidation proceeds stepwise through peroxide. The potentials of the foregoing couples are disclosed, for example, in chapter IV., under "Oxygen" of "The Oxidation States of the Elements and Their Potentials in Aqueous Solutions," by Wendell M. Latimer, published by Prentice-Hall, Inc., 1938. The above-indicated catalytic species are produced on the addition of compounds such as $KMnO_4$, $MnO_2$, $MnSO_4$, $CuSO_4$, $Cu_2O$, $CuCl_2$, $TlNO_3$, and $V_2O_5$ in amounts ranging from 0.1 mg./liter for the more effective catalysts such as the copper couple to a few grams/liter of the less effective materials as discussed further hereinafter.

In practice, leaching is conducted at temperatures above about 80° C. and preferably at about 90° C. to obtain maximum rates and degrees of dissolution. The oxidant, if air or $O_2$, is bubbled continuously through the agitated mixture, if hypochlorite, is added incrementally or at the beginning of the leaching. $Cl_2$ gas should be equivalent to the hypochlorite and other strong oxidizing agents should produce similar results.

Following leaching, the uranium is separated from the leach solution by a variety of conventional filtration or centrifugation processes. The uranium can be precipitated from leach solutions containing vanadium as a synthetic carnotite by acidification to a pH of about 6 from which the uranium and vanadium can be obtained as $UO_2$ and $V_2O_5$ by standard processes. The uranium can also be recovered and purified from such solutions by adsorption on a strong base anion exchange resin such as Dowex 1 followed by selective elution as disclosed in the copending application of Richard H. Bailes et al., Serial No. 362,122, filed June 16, 1953, which issued as Patent No. 2,864,667 on December 16, 1958. Uranium is also precipitated from such carbonate leach solutions by reducing agents such as $Na_2S_2O_4$, Zn and ammonia, and Zn and cyanide. Treatment with 0.2% sodium amalgams finely dispersed in solutions at about 25° C. also precipitates the uranium as a hydrous oxide.

Necessary conditions and procedures for obtaining beneficial results in accordance with the teachings of the invention will be apparent from the following description of systematic experimental studies of various operating conditions.

At the outset, the distinctive behavior of various additive agents with reference to oxidative leaching was explored using a standard procedure wherein various amounts of the agent were added to a leach solution containing 0.5M $Na_2CO_3$ and 0.5M $NaHCO_3$, in contact with 5 g./liter of $U_3O_8$ at a temperature of 90° C., with air blown at a standard rate therethrough and for a standard time period. A number of control runs with no additive were made to serve as standard, giving a range of 20 to 30% of the $U_3O_8$ being dissolved. From the results, tabulated below, the materials can be classed as inhibitors, as having no effect, as being oxidants, or as being catalysts. The differentiation between the latter is made on the basis that catalytic agents improve the leaching when either the oxidized or reduced form of the agent is introduced, while oxidants improve the leaching only when the oxidized form is added generally in much larger amounts than is required for catalysis.

TABLE I

| Agent (Inhibitors) | Percent Leached | Agent (No Effect) | Percent Leached |
|---|---|---|---|
| 25 g./l. $FeSO_4$ | 1 | 5 g./l. Na indigodisulfonate | 20 |
| 25 g./l. Pyrogallol | 1 | 5 g./l. Na diphenylamine p-sulfonate | 20 |
| 25 g./l. $NH_2OH \cdot HCl$ | 3 | 5 g./l. Na 1-10 phenanthroline monohydrate | 20 |
| 5 g./l. Quinhydrone | 6 | 5 g./l. $KClO_3$ | 25 |
| 5 g./l. $SnCl_2 \cdot 2H_2O$ | 5 | 5 g./l. $NaNO_2$ | 30 |
|  |  | 5 g./l. $NiCl_2 \cdot 6H_2O$ | 30 |
|  |  | 5 g./l. $UO_2(NO_3)_2$ | 25 |
|  |  | 5 g./l. $Na_3$ citrate $\cdot 2H_2O$ | 15 |
|  |  | 5 g./l. $(NH_4)_2$ oxalate $\cdot H_2O$ | 20 |

| Agent (Oxidants) | Percent Leached | Agent (Catalyst) | Percent Leached |
|---|---|---|---|
| .25M $H_2O_2$ | 100 | 25 g./l. $KMnO_4$ | 100 |
| .04 $H_2O_2$ | 55 | 25 g./l. $MnO_2$ | 100, 100 |
| 25 g./l. $PbO_2$ | 100 | 5 g./l. $MnO_2$ | 100 |
| 5 g./l. $PbO_2$ | 30 | 2.5 g./l. $MnO_2$ | 100 |
| 5 g./l. $Pb_3O_4$ | 75 | 10 g./l. $MnSO_4 \cdot H_2O$ | 85 |
| 5 g./l. PbO | 20 | 5 g./l. $MnSO_4 \cdot H_2O$ | 35 |
| 5 g./l. $K_3Fe(CN)_6$ | 100 | 5 g./l. $CuSO_4 \cdot 5H_2O$ | 100 |
| 5 g./l. $K_4Fe(CN)_6 \cdot 3H_2O$ | 25 | 8.5 g./l. $CuSO_4 \cdot 5H_2O + NH_4OH$ | 100 |
| 5 g./l. $NaBiO_3$ | 50 | 5 g./l. $Cu_2O$ | 70, 85 |
| 5 g./l. $K_2Cr_2O_7$ | 100, 90 | 5 g./l. $CoCl_2 \cdot 6H_2O$ | 55 |
| 5 g./l. $HgCl_2$ | 100 | 5 g./l. $CoCl_2 \cdot 6H_2O + NH_4OH$ | 45 |
| 5 g./l. $Hg_2Cl_2$ | 100 | 5 g./l. $TlNO_3$ | 45 |
| 5 g./l. Hg | 20 | 5 g./l. $V_2O_5$ | 60 |
| 8 g./l. NaClO (Purex) | 85 |  |  |

A standard procedure and experimental apparatus was employed for a more complete elucidation of the operating conditions using $U_3O_8$, $UO_2$, ulraninite and other ores. 300 ml. of leach solution was disposed in a 500 ml. 3-neck flask and the system purged with the test gas (air, $O_2$, or $N_2$) and a bubbling flow of about 10 ml./min. of the gas was continued during the experiment with continuous stirring. The temperature was brought to the desired level and solid containing uranium equivalent to 1 g./liter of solution was added. Copper and other catalysts were added as solids or solutions, e.g., $CuSO_4$ solutions. Samples were taken hourly and uranium determined fluorimetrically.

A stock quantity of $U_3O_8$ was prepared by the decomposition of $UO_3$ (Shattuck) at 1100° C. yielding a material whose X-ray diffraction pattern agreed with that given in ASTM data card No. 4-0518. The $UO_2$ was also obtained from S. W. Shattuck Co., lot No. 10054 and yielded X-ray diffraction data typical of prepared $UO_2$. Uraninite labeled "Urananite (pitchblende)" from the Great Bear Lake area and analyzing 50% $U_3O_8$ was obtained from Wards. The ores, all ground to −100 mesh, tabulated below were also used. It is to be expected that lots of different origins and different methods of preparation will vary in behavior; however, results with identical lots will be self-consistent and accurately indicate consistent trends in the several variations of the process described hereinafter.

TABLE II

| Ore | Analyses of Tested Ore | | | |
|---|---|---|---|---|
| | Percent $U_3O_8$ | Percent $V_2O_5$ | Percent $CaCO_3$ | Percent Fe |
| Monticello No. 27 | 0.16 | 0.06 | 6.16 | 2.90 |
| ACM Grey Special | 0.96 | trace | 92.8 | 0.26 |
| Garwood & Gerlock No. 10453 | 0.43 | 1.35 | 9.96 | 0.40 |
| Big Buck No. 10521 | 0.38 | 0.03 | 1.68 | 0.28 |

EFFECT OF SOLID CONTENT IN SOLUTION

The effect of variations in the amount of solid source material present in the solution was determined using 25 mg./liter of Cu added as $CuSO_4$ at 90 C. air bubbled yielding the maximum leaching rates with the leaching solutions as tabulated below:

TABLE III

| Conditions | Fraction $U_3O_8$ leached per hour | |
|---|---|---|
| | 1 g./l. max. | 2 g./l. max. |
| .5M $Na_2CO_3$—.5M $NaHCO_3$ | 0.14 | 0.15 |
| .5M $Na_2CO_3$—.5 $NaHCO_3$, .1M $NH_4OH$ | 0.30 | 0.31 |
| .9M $Na_2CO_3$—.1M $NaHCO_3$ | 0.23 | 0.24 |

As anticipated the initial leaching rate, i.e., the max. rate, is directly proportional to solid content within experimental error; however, since the relative rate of leaching was essentially independent of the solid content the remainder of the experiments were done using solid equivalent to 1 g./l. of $U_3O_8$. That the absolute rate of leaching does not fall off as rapidly as might be expected may be due to the fact that surface area (to which the rate should be proportional) does not decrease as rapidly as the volume (to which the weight is proportional). The large increase in extraction rate using ammonia is apparent therein.

TEMPERATURE EFFECT 0.5M $Na_2CO_3$—0.5M $NaHCO_3$ solutions catalyzed with $Cu(CuSO_4)$ with and without ammonia were used to leach $U_3O_8$ at 70 and 90° C. with air bubbling and with the results tabulated below:

TABLE IV

| Conditions | Fraction $U_3O_8$ leached per hour | |
|---|---|---|
| | 90° C. | 70° C. |
| 25 mg./l. Cu | 0.019 | 0.009 |
| 25 mg./l. Cu+.1M $NH_4OH$ | 0.14 | 0.043 |
| | 0.29 | 0.074 |

The results indicate that leaching at temperatures as low as 70° C. are uneconomical and that leaching at 90° C. is much more preferable so that the remainder of the experiments were done at 90° C. At temperatures above 80° C. the leaching rate increases at a rapid rate.

EFFECT OF IONIC STRENGTH

Since pH changes in a $CO_3^=$—$HCO_3^-$ system result in large changes in ionic strength, controlled leach solution pairs in one of the members of which was included substantial amounts of sodium salts were used to leach $U_3O_8$ at 90° C. air bubbling with other conditions and results tabulated below:

TABLE V

| Conditions | Fraction $U_3O_8$ leached per hour |
|---|---|
| .5M $Na_2CO_3$—.5M $NaHCO_3$, 25 mg./l. Cu | 0.14 |
| .5M $Na_2CO_3$—.5M $NaHCO_3$, 25 mg./l. Cu, .4M $Na_2SO_4$ | 0.14 |
| .9M $Na_2CO_3$—.1M $NaHCO_3$ | 0.035 |
| .9M $Na_2CO_3$—.1M $NaHCO_3$, .4M $NaNO_3$ | 0.040 |

As may be seen therefrom, variations in ionic strength have little, if any, effect on leaching rates.

EFFECT OF COPPER CATALYST CONCENTRATION

Leach rate variations with various copper catalyst concentrations, added as $CuSO_4$ solution, were determined using two different leach solution compositions, with both air and $N_2$ bubbling at 90° C. to leach $U_3O_8$ with the results tabulated below:

TABLE VI

| | Fraction $U_3O_8$ Leached Per Hour | | | |
|---|---|---|---|---|
| Conditions | .5M $CO_3^=$—.5M $HCO_3^-$ | | .9M $CO_3^=$—.1M $HCO_3^-$ | |
| | Air | $N_2$ | Air | $N_2$ |
| Mg./l. Cu: | | | | |
| 0 | 0.020 | | 0.035 | |
| 0.25 | 0.074 | | 0.12 | |
| 2.5 | 0.11 | | 0.18 | |
| 25 | 0.14 | 0.036 | 0.23 | 0.081 |
| 50 | | 0.061 | | |
| 125 | | 0.10 | | 0.14 |
| 250 | | 0.135 | | |
| 500 | | 0.153 | | |

It will be seen from the foregoing that the leach rate increased with increasing Cu catalyst concentration in all cases although the power dependence is considerably less than one. The remarkable effectiveness of the catalysis on air oxidation with even very small amounts of Cu is apparent. Under $N_2$ the dependence on Cu appears to be approaching the first power at low Cu concentrations. Under air the dependence is much less even correcting for direct air oxidation which might be occurring simultaneously. Note that at 25 mg./l. Cu the rate under $N_2$ is much lower than under air even when the latter is corrected for air oxidation. This observation can only be explained by the formation of oxidizing species other than cupric in the air blown system. The obvious explanation is the formation of peroxide in the reoxidation of cuprous ion or copper metal if, during the catalytic reaction, the cupric state is reduced to that extent.

Various mechanisms are possible to explain the results although simple mechanisms alone cannot explain the data, i.e., that the rate under air (corrected for uncatalyzed direct air oxidation) is $$\frac{.10}{.036}=2.8$$

times that under $N_2$ instead of twice or four times which may be explained by simple mechanisms.

EFFECT OF INCREASED $O_2$ CONCENTRATION $U_3O_8$ was leached under standard conditions described above at 90° C.; however, $O_2$ was bubbled through the leach solution of the character and with the results tabulated below. The results of comparable operations with air are included for comparison.

TABLE VII

| Conditions | Fraction U₃O₈ Leached Per Hour | |
|---|---|---|
| | Air | O₂ |
| .5M Na₂CO₃—.5M NaHCO₃ | 0.019 | 0.04 |
| .5M Na₂CO₃—.5M NaHCO₃, 2.5 mg./l. Cu | 0.11 | 0.12 |
| .5M Na₂CO₃—.5M NaHCO₃, 2.5 mg./l. Cu+.1M NH₄OH | 0.165 | 0.17 |
| .9M Na₂CO₃—.1M NaHCO₃, 2.5 mg./l. Cu | 0.19 | 0.23 |

It will be noted that the use of $O_2$ increased the leaching rate slightly; however, the increase is no more than which can be accounted for by the expected increase in normal uncatalyzed oxidation. The use of $O_2$ produces no increase in the rate of catalyzed oxidation and leaching.

EFFECT OF VARYING TOTAL CARBONATE SPECIES CONCENTRATION

Pairs of catalyzed leaching solutions having two different ratios of $CO_3^=/HCO_3^-$ at two different total concentrations were used to leach $U_3O_8$ at 90° C. with air bubbling under standard conditions with the results tabulated below:

TABLE VIII

| Conditions | Fraction U₃O₈ Leached Per Hour |
|---|---|
| .5M Na₂CO₃—.5M NaHCO₃, 25 mg./l. Cu | 0.14 |
| .25M Na₂CO₃—.25M NaHCO₃, 25 mg./l. Cu | 0.14 |
| .9M Na₂CO₃—.1M NaHCO₃, 25 mg./l. Cu | 0.23 |
| .45M Na₂CO₃—.05M NaHCO₃, 25 mg./l. Cu | 0.16 |

It will be noted that a $CO_3^=/HCO_3^-$ ratio of 1, the indicated change in total carbonate species concentration produced no change in the leaching rate. At a ratio of 9, the rate fell off considerably indicating that the leaching rate is critically and increasingly dependent on the $HCO_3^-$ concentration in the range of 0.05M to 0.1M than it is in the range of 0.25M to 0.5M. Also, the rate at 0.45M $CO_3^=$—0.05M $HCO_3^-$ is higher than at 0.5M $CO_3^=$—0.5M $HCO_3^-$ even though the total concentration of carbonate species as well as $HCO_3^-$ is lower. These facts indicate that the variations noted are attributable to pH variations and not to ionic strength or total carbonate concentrations, a deduction which is confirmed hereinafter.

EFFECT OF VARYING pH

Pairs of solutions with varying amounts of $CuSO_4$ catalyst with ratios of 1:1 and 9:1 of $CO_3^=/HCO_3^-$ were used to leach $U_3O_8$ at 90° C. in air and $N_2$ with the results tabulated below:

TABLE IX

| Conditions | Fraction U₃O₈ Leached Per Hour | | Ratio |
|---|---|---|---|
| | .5M Na₂CO₃—.5M NaHCO₃ | .9M Na₂CO₃—.1M NaHCO₃ | |
| 0.25 mg./l. Cu(air) | 0.074 | 0.12 | 1.62 |
| 2.5 mg./l. Cu(air) | 0.11 | 0.185 | 1.68 |
| 25 mg./l. Cu(air) | 0.14 | 0.23 | 1.64 |
| 25 mg./l. Cu(N₂) | 0.036 | 0.08 | 2.2 |
| 125 mg./l. Cu(N₂) | 0.10 | 0.14 | 1.4 |

It will be noted that increasing the ratio of $$CO_3^=/HCO_3^-$$

from 1 to 9 increased the rate of leaching in all cases. When the ratio was changed to 0.11 the leaching rate was lower. The leaching rate ratios under air are remarkably constant indicating the complete effectiveness of even very small amounts of Cu catalyst under the indicated conditions. With total carbonate species remaining constant, $CO_3^=$ concentration and pH are interrelated. The change in ratio of 0.5M $Na_2CO_3$—0.5M $HCO_3^-$ to 0.9M $Na_2CO_3$—0.1M $NaHCO_3$ corresponds to a pH change from 9.9 to 10.9 or a factor of 10 in $OH^-$ concentration. The benefits to be derived from operating with $CO_3^=/HCO_3^-$ ratios giving a pH near 10.9, i.e., a practical range of about pH 10.5 to 11.1 being indicated, are obvious.

CATALYTIC ENHANCEMENT WITH COMPLEXING AGENTS

Leaching solutions of constant 0.5M $Na_2CO_3$—0.5M $NaHCO_3$ composition with various complexing agents present were used to leach $U_3O_8$ at 90° C. with air bubbling with the results tabulated below:

TABLE X

| Conditions | Fraction U₃O₈ Leached Per Hour |
|---|---|
| 25 mg./l. Cu | 0.14 |
| 25 mg./l. Cu + .1M NH₄OH | 0.29 |
| 25 mg./l. Cu + .1M Pyridine | 0.17 |
| 25 mg./l. Cu + .1M NaCN | 0.017 |
| 25 mg./l. Cu as Cu(NH₂CH₂CH₂NH₂)₂(NO₃)₂ | 0.16 |

It will be observed that ammonia greatly increased the rate while pyridine and ethylenediamine have a slight beneficial effect. Cyanide had a strong adverse effect explainable by the fact that $CN^-$ complexes the cuprous state so strongly that reoxidation cannot take place and the catalytic cycle is blocked. The ammonia undoubtedly converts the copper to a more effective ionic species having different charge characteristics and more favorable oxidation-reduction potentials than those present in the absence of ammonia.

COPPER-AMMONIUM CATALYSIS VARIABLES (1) Concentration of catalyst: Pairs of $$0.5M\ Na_2CO_3—0.5M\ NaHCO_3$$

solutions containing different amounts of $Cu(CuSO_4)$ with and without ammonia added were used to leach $U_3O_8$ at 90° C. and with air bubbling, with the results tabulated below:

TABLE XI

| Conditions | Fraction U₃O₈ Leached Per Hour | | Ratio |
|---|---|---|---|
| | .5M Na₂CO₃—.5M NaHCO₃ | .5M Na₂CO₃—.5M NaHCO₃—.1M NH₄OH | |
| mg./l. Cu: | | | |
| 0 | 0.020 | | |
| 0.25 | 0.074 | 0.087 | 1.17 |
| 2.5 | 0.11 | 0.165 | 1.5 |
| 25 | 0.14 | 0.29 | 2.07 |

As may be noted the rate of leaching increases much more rapidly with increasing $Cu(NH_3)_4^{++}$ concentration than with Cu (ionic species) alone, though the dependence is still less than first power. The enhancement effect of ammonia may be quite specific for copper since in similar experiments with $Co^{++}$ and 0.1M $NH_4OH$ the rate was only 0.021 as compared to 0.020 for no catalyst as above.

(2) $NH_4OH$ concentration effects: Solutions containing 0.5M $Na_2CO_3$—0.5M $NaHCO_3$ and equivalent amounts of Cu (25 mg.) were used to leach $U_3O_8$ at 90° C. with air bubbling with the results tabulated below:

TABLE XII

| Conditions | Fraction U₃O₈ Leached Per Hour |
|---|---|
| .1M NH₄OH | 0.29 |
| .25M NH₄OH | 0.29 |

It will be observed that increasing the ammonia concentration from 0.1M to 0.25M had no effect. The possibility that the catalytic couple is $$Cu(NH_3)_2^+ - Cu(NH_3)_4^{++}$$

is therefore doubtful since the ammonia concentration would effect the potential of such couple thereby affecting the leaching rate. This circumstance may indicate that the catalytic couple involves a mixed ammonia-carbonate complex, e.g., $Cu(NH_3)_2^+ - Cu(NH_3)_2CO_3$. It is apparent that ammonia concentrations lower than 0.1M should also be effective, e.g., 0.025 or 0.050 and above.

CATALYTIC LEACHING OF OTHER SOLIDS

Carbonate solutions were used under control and various catalyzed conditions to leach $UO_2$, uraninite and various ores at 90° C. with either air or $O_2$ bubbling and with the results tabulated below:

TABLE XIII $UO_2$ Leaching Results

| Conditions | Fraction $UO_2$ Leached Per Hour |
|---|---|
| .5M $Na_2CO_3$—.5M $NaHCO_3$—air | 0.038 |
| .5M $Na_2CO_3$—.5M $NaHCO_3$+25 mg./l. Cu—air | 0.040 |
| .5M $Na_2CO_3$—.5M $NaHCO_3$+25 mg./l. Cu+.1M $NH_4OH$—air | 0.083 |
| .5M $Na_2CO_3$—.5M $NaHCO_3$+25 mg./l. Cu+.1M $NH_4OH$+$O_2$ | 0.165 |
| .9M $Na_2CO_3$—.1M $NaHCO_3$+25 mg./l. Cu—air | 0.050 |

The improved results were similar to those obtained with $U_3O_8$, i.e., Cu catalysis improved leaching and the improved leaching is enhanced at higher pH and in the presence of ammonia. Moreover, the use of $O_2$ also yielded a more pronounced enhancement in the present case than with $U_3O_8$ supra.

Uraninite was leached similarly to the $UO_2$ above with the following results:

TABLE XIV

Uraninite Leaching Results

| Conditions | Fractions Uraninite Leached Per Hour | |
|---|---|---|
| | First 60% | Last 40% |
| Nothing | 0.20 | 0.085 |
| 25 mg./l. Cu air | 0.38 | 0.087 |
| 25 mg./l. Cu+.1M $NH_4OH$—air | 0.46 | 0.105 |

As may be observed copper and copper-ammonia catalysis gave successively higher leaching rates over the control as above with $U_3O_8$ and $UO_2$. The catalytic effect appears to be most pronounced during dissolution of the initial 60% of the uranium.

Various ores were leached for 6 hours at 90° C. with air bubbling with the results tabulated below. Control runs using a standard oxidant are included for comparison.

TABLE XV

Ore Leaching Results

| Ore | Percent $U_3O_8$ Leached | | | |
|---|---|---|---|---|
| | .9M $Na_2CO_3$—.1M $NaHCO_3$ | | | .5M $Na_2CO_3$—.5M $NaHCO_3$, .1M $NH_4OH$ |
| | No. Cat. | 25 mg./l. Cu | 600 mg./l. $KMnO_4$ | 25 mg./l. Cu |
| Monticello No. 27 | 67 | 65 | 77 | 78 |
| Big Buck No. 10521 | 47 | 47 | 63 | 58 |
| ACM Grey Special | 66 | 89 | 90 | 96 |
| Garwood and Gerlock No. 10453 | 74 | 86 | 94 | 94 |

As may be noted the copper-ammonia catalyzed aerated leaching is at least as good if not superior to any other tested. The results with the indicated ores would be further improved with finer grinding in accordance with conventional practice.

HYPOCHLORITE OXIDATION AND LEACHING

While copper catalyzed aeration oxidation leaching, especially with ammonia, is very economical and at least as good as any other, the required equipment may sometimes be more complex and engineering costs are somewhat greater than using standard chemical oxidants. Permanganate has generally been found most effective in conventional practice. However, it has now been found that hypochlorite oxidation is quite rapid and efficient and, moreover, is also improved by copper catalysis. The equivalent reagent cost of hypochlorite is less than with permanganate. For example, a 25% excess of hypochlorite over the stoichiometric amounts required to oxidize 0.0037M $UO_2$ gave 100% leaching with a carbonate leach solution in 6 hours at 90° C. Variables in hypochlorite leaching were studies as follows:

HYPOCHLORITE CONCENTRATION

The effect produced by varying the hypochlorite concentration was determined by leaching $UO_2$ solid with 0.5M $Na_2CO_3$—0.5M $NaHCO_3$ solutions at 90° C. $N_2$ atmosphere with aqueous hypochlorite added in the amounts and with the results tabulated below. The $N_2$ atmosphere is employed to eliminate air oxidation effects which would complicate interpretation of results. In actual practice air atmosphere could be used thereby obtaining enhanced results and additional economics.

TABLE XVI

| Conditions | Fraction $UO_2$ Leached Per Hour |
|---|---|
| 16.7 ml./1.5% NaClO | 0.83 |
| 6.7 ml./1.5% NaClO | 0.46 |

As may be noted the rate of leaching increases with increased $ClO^-$ but with a low power dependence (between 0.5 and 1.0). The lower apparent rate may be due to disproportionation of $ClO^-$ into $Cl^-$ and $ClO_3^-$.

TEMPERATURE 6.7 ml. of 5% NaClO was added to 0.5M $$Na_2CO_3 - 0.5M\ NaHCO_3$$

solutions and the solutions were employed to leach $UO_2$ solid at 70 and 90° C. in $N_2$, with the results tabulated below:

TABLE XVII

| Conditions, ° C. | Fraction $UO_2$ Leached Per Hour |
| --- | --- |
| 90 | 0.46 |
| 70 | 0.25 |

As in air oxidation lowering the temperature decreases the leaching rate significantly and it is therefore preferred to operate in the range of 80° C. to above 90° C.

CATALYSIS

Various possible catalytic agents were added to 0.5M $Na_2CO_3$—0.5M $NaHCO_3$ solutions with 6.7 ml. of NaClO present which solutions were used to leach $UO_2$ at 90° C. $N_2$ atmosphere with the results tabulated below:

TABLE XVIII

| Conditions | Fraction $UO_2$ Leached Per Hour |
| --- | --- |
|  | 0.46 |
| 25 mg./l. Cu | 0.60 |
| .004M Mn | 0.46 |
| .004M Fe(CN)$^{-4}$ | 0.43 |

As above Cu($CuSO_4$) exerts a pronounced catalytic effect. The fact that cupric materials should exert about the same absolute effect as in air is reasonable since the reoxidation of the reduced copper species is not the slow step in the catalytic cycle, hence the character of the oxidant makes little difference.

EFFECT OF pH VARIATION

Leach solutions of varying carbonate species content and containing 6.7 ml. of 5% NaClO were used to leach $UO_2$ at 90° C. and with an $N_2$ atmosphere with the results tabulated below:

TABLE XIX

| Conditions | Fraction $UO_2$ Leached Per Hour |
| --- | --- |
| 1M $NaHCO_3$ | 1(i.e.±.75) |
| .5M $NaHCO_3$—.5M $Na_2CO_3$ | 0.46 |

Also the leaching rate was greater in 1.0M $NaHCO_3$ than in the 0.5M $Na_2CO_3$—0.5M $NaHCO_3$ solutions. These results are contrary to those obtained with air oxidation but are reasonable in the present case since the $Cl_2$—$ClO^-$ potential becomes more favorable for $UO_2$ oxidation with decreasing pH and the tendency of $ClO^-$ to disproportionate into $Cl^-$ and $ClO_3^-$ is less.

EFFECT OF HYPOCHLORITE CONCENTRATION ($U_3O_8$)

The effect of varying $ClO^-$ concentration on the leaching of U from $U_3O_8$ was studied by adding two different amounts of 5% NaClO to 0.5M $Na_2CO_3$—0.5M $NaHCO_3$ solution in contact with $U_3O_8$, at 90° C. in an $N_2$ atmosphere under the conditions and with the results tabulated below:

TABLE XX

| Conditions | Fraction $U_3O_8$ Leached Per Hour |
| --- | --- |
| 6.7 ml./l. 5% NaClO | 0.32 |
| 2.2 ml./l. 5% NaClO | 0.22 |

It is interesting to note that the leaching rate with $U_3O_8$ is less than with $UO_2$ with the same NaClO concentration. This is the reverse of the air oxidation results with the same lot of $U_3O_8$ and $UO_2$ for which no explanation is apparent.

EFFECT OF pH ON HYPOCHLORITE LEACHING ($U_3O_8$)

$U_3O_8$ was leached with 1M total carbonate species concentration at different pH values with a carbonate leach solution containing 6.7 ml. of 5% NaClO at 90° C. in $N_2$ as with $UO_2$ with the results tabulated below:

TABLE XXI

| Conditions | Fraction $U_3O_8$ Leached Per Hour |
| --- | --- |
| 1M $NaHCO_3$ | 0.45 |
| .5M $NaHCO_3$—.5M $Na_2CO_3$ | 0.32 |

Note that the rate in 1M $NaHCO_3$ is substantially greater than with 0.5M $Na_2CO_3$—0.5M $NaHCO_3$ and similar reasoning is applicable as with $UO_2$.

ORE LEACHING WITH HYPOCHLORITE

Various carbonate solutions with 6.7 ml. NaClO were used to leach various ores for 6 hours at 90° C. with air blowing (oxidation) with the results tabulated below:

TABLE XXII

| Ore | Percent $U_3O_8$ Leached | | |
| --- | --- | --- | --- |
|  | 1M $HCO_3^-$ | .5M $CO_3^-$—.5M $HCO_3$ | .9M $CO_3^-$—.1M $HCO_3^-$ |
| Monticello No. 27 |  | 81 |  |
| Big Buck No. 10521 |  | 47 | 58 |
| ACM Grey Special | 91 | 93 |  |
| Garwood & Gerlock No. 10453 |  | 91 |  |

Under the observed conditions, the pH dependence noted above apparently does not apply; however, the results are explainable on the basis that air-oxidation leaching increases with increasing pH and that this effect is dominant. In any event it can be seen that leaching as above is comparable to that achieved with 0.600 g./l. of $KMnO_4$ or copper-ammonia catalyzed air oxidation leaching. The amount of hypochlorite is cheaper as chlorine than the amount of $KMnO_4$ required to obtain equivalent recovery. Moreover, a far less objectionable contaminant is introduced into the system.

While there have been described in the foregoing what may be considered to be preferred embodiments of the invention, modifications may be made therein without departing from the teachings of the invention and it is intended to cover all such as fall within the scope of the appended claims.

What is claimed is:

1. In a process for leaching uranium from a solid containing uranium in hexavalent and lower oxidation states, the steps comprising contacting said solid with a carbonate leach solution containing catalytic amounts of the ionic species of copper in the presence of ammonia at a temperature of above about 80° C., and simultaneously adding an oxidizing agent to said solution to oxidize and dissolve the uranium from said solid.

2. A process for recovering uranium from a solid containing uranium in hexavalent and lower valent states comprising reducing said solid to a particle size of below about —100 mesh, contacting said solid with a carbonate leach solution containing ammonia together with catalytic amounts of ionic species of copper at a temperature of above about 80° C., simultaneously adding an oxidizing agent to said solution to oxidize and leach the uranium from said solid to produce a carbonate leach solution containing hexavalent uranium, and recovering uranium from the leach solution.

3. A process for recovering uranium from a solid containing uranium in hexavalent and lower valent states comprising reducing said solid to a particle size of below about −100 mesh, contacting said solid with a carbonate leach solution containing catalytic amounts of ionic species of copper in the presence of ammonia at a temperature of above about 80° C., simultaneously adding at least one oxidizing agent selected from the group consisting of air, $O_2$ and hypochlorite to said solution, said carbonate solution having a ratio of $CO_3^=/HCO_3^-$ concentrations yielding a pH in the range 10.5 to 11.1 with said air and $O_2$ oxidants and a $HCO_3^-$ concentration of about 1M with said hypochlorite oxidant to oxidize and leach the uranium from said solid to produce a carbonate leach solution containing hexavalent uranium, and recovering uranium from the leach solution.

4. The process as described in claim 3 wherein said oxidizing agent comprises air.

5. The process as described in claim 3 wherein said oxidizing agent comprises air and said temperature is about 90° C.

6. The process as defined in claim 3 wherein said oxidizing agent comprises $O_2$.

7. The process as defined in claim 3 wherein said oxidizing agent comprises hypochlorite.

8. A process for recovering uranium from a solid containing uranium in hexavalent and lower valent states comprising reducing said solid to a particle size of below about −100 mesh, contacting said solid with a carbonate leach solution having a pH in the range of about 10.5 to 11.1, containing ammonia together with catalytic amounts of ionic species of copper at a temperature of above about 80° C., simultaneously providing an oxidizing agent in said solution to oxidize and leach the uranium from said solid to produce a carbonate leach solution containing hexavalent uranium, and recovering uranium from the leach solution.

9. The process as defined in claim 8 wherein said carbonate leach solution is at a temperature of about 90° C.

References Cited in the file of this patent

UNITED STATES PATENTS 2,813,003    Thunaes et al. _____ Nov. 12, 1957

OTHER REFERENCES

Brown: Preliminary Investigation of Carbonate Leaching ACCO–36, Oct. 15, 1953, declass. Sept. 23, 1955, pages 5–32 relied on.

Proceedings of the International Conference on the Peaceful Uses of Atomic Energy, Aug. 8–20, 1955, vol. 8, pages 8, 9, 18–22, 28 and 32–37.

AEC Document RMO–2621 June, 1956, pages 1–27.